US006224685B1

(12) United States Patent
Gross et al.

(10) Patent No.: US 6,224,685 B1
(45) Date of Patent: May 1, 2001

(54) MICROEMULSION COMPOSITION FOR CLEANING HARD SURFACES

(75) Inventors: Stephen F. Gross, Souderton, PA (US); Martin J. Barabash, Jamesburg, NJ (US); J. Frederick Hessel, Doylestown, PA (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/246,349

(22) Filed: Feb. 8, 1999

Related U.S. Application Data

(63) Continuation-in-part of application No. 08/869,361, filed on Jun. 3, 1997, now abandoned.

(51) Int. Cl.[7] .................................................... C09D 9/04
(52) U.S. Cl. .......................................... 134/38; 134/22.19
(58) Field of Search ................................. 134/38, 40, 39, 134/22.19; 510/202, 212, 505, 206, 407, 201, 203, 207, 213; 252/364

(56) References Cited

U.S. PATENT DOCUMENTS

| 5,011,620 | * | 4/1991  | Dishart et al. ........................ 252/118 |
| 5,082,584 | * | 1/1992  | Loth et al. ............................ 252/122 |
| 5,084,200 | * | 1/1992  | Dishart et al. ........................ 252/173 |
| 5,441,662 | * | 8/1995  | Schwadtke et al. .................. 252/108 |
| 5,591,376 | * | 1/1997  | Kiewert et al. ....................... 510/437 |
| 5,616,548 | * | 4/1997  | Thomas et al. ....................... 510/242 |
| 5,672,579 | * | 9/1997  | Diaz et al. ............................ 510/405 |
| 5,952,287 | * | 9/1999  | Gross et al. .......................... 510/417 |
| 5,990,072 | * | 11/1999 | Gross et al. .......................... 510/417 |

* cited by examiner

*Primary Examiner*—Yogendra Gupta
*Assistant Examiner*—Gregory E. Webb
(74) *Attorney, Agent, or Firm*—John E. Drach; Steven J. Trzaska

(57) ABSTRACT

A terpene-free hard surface cleaning composition containing: (a) a nonionic surfactant; (b) an anionic surfactant; (c) a primary solvent consisting of a $C_6$–$C_{14}$ methyl ester; (d) a short-chain cosurfactant; and (e) water, all weights being based on the total weight of the composition.

13 Claims, No Drawings

MICROEMULSION COMPOSITION FOR CLEANING HARD SURFACES

CROSS REFERENCE TO RELATED APPLICATIONS

This application is a continuation-in-part of application Ser. No. 08/869,361, filed Jun. 3, 1997 abandoned.

FIELD OF THE INVENTION

The present invention generally relates to a cleaning composition for hard surfaces. More particularly, the invention relates to a novel hard surface cleaning formulation having superior cleaning ability which is free of VOC-containing solvents.

BACKGROUND OF THE INVENTION

General purpose household cleaning compositions for hard surfaces such as metal, glass, ceramic, plastic and linoleum surfaces are commercially available in both powdered and liquid form. Powdered cleaning compositions consist mainly of builder or buffering salts such as phosphates, carbonates, and silicates and although such compositions may display good inorganic soil removal, they exhibit inferior cleaning performance on organic soils such as greasy/fatty/oily soils.

Liquid cleaning compositions, on the other hand, have the great advantage that they can be applied to hard surfaces in neat or concentrated form so that a relatively high level of surfactant material is delivered directly to the soil. Moreover, it is a rather more straightforward task to incorporate high concentrations of anionic or nonionic surfactant in a liquid rather than a granular composition. For both of these reasons, therefore, liquid cleaning compositions have the potential to provide superior grease and oily soil removal over powdered cleaning compositions.

Nevertheless, liquid cleaning compositions suffer a number of drawbacks which can limit their consumer acceptability. Thus, they generally contain little or no detergency builder salts and consequently they tend to have poor cleaning performance on particulate soil and also lack effectiveness under varying water hardness levels. In addition, they can suffer problems relating to homogeneity, clarity, and viscosity when used by consumers. Moreover, the higher in-use surfactant concentration necessary for improved grease soil removal causes further problems relating to extensive suds formation requiring frequent rinsing and wiping on behalf of the consumer.

A solution to the above-identified problems has involved the use of saturated and unsaturated terpenes, in combination with a polar solvent, in order to increase the cleaning effectiveness of the hard surface cleaner and control sudsing. A problem associated with the use of terpenes such as, for example, d-limonene, is that their price, as a raw material, tends to fluctuate wildly. Consequently, the cost to manufacture hard surface liquid cleaners containing terpene solvents is financially disadvantageous to both producers and consumers.

Other solvents which are often employed in hard surface cleaning compositions, instead of terpenes, include those derived from aliphatic, aromatic and halogenated hydrocarbons. Their use, however, is undesirable for environmental reasons due to the presence of volatile organic compounds (VOC's) therein.

Consequently, it would be highly desirable to employ a solvent which is both free of volatile organic compounds and is not subject to any significant fluctuations in pricing for the raw material.

SUMMARY OF THE INVENTION

The present invention is directed to a terpene-free hard surface cleaning composition containing:
(a) from about 0.2 to about 10% by weight of a nonionic surfactant;
(b) from about 0.5 to about 10% by weight of an anionic surfactant;
(c) from about 5 to about 95% by weight of a primary solvent consisting of a $C_6$–$C_{14}$ methyl ester;
(d) from about 0.5 to about 10% by weight of a short-chain cosurfactant; and
(e) remainder, water, all weights being based on the total weight of the composition.

The present invention is also directed to a process for cleaning a hard surface involving contacting the hard surface with the above-disclosed cleaning composition over a predetermined length of time.

DESCRIPTION OF THE INVENTION

Other then in the operating examples, or where otherwise indicated, all numbers expressing quantities of ingredients or reaction conditions used herein are to be understood as being modified in all instances by the term "about".

Suitable nonionic surfactants which may be employed in the present invention include, but are not limited to, alkyl polyglycosides, polyethylene oxide condensates of alkyl phenol having an alkyl group containing from about 6 to about 12 carbon atoms in either straight or branched-chain configuration, the ethylene oxide being present in amounts equal to from 5 to 25 moles of ethylene oxide per mole of alkyl phenol.

Condensation products of primary or secondary alcohols having from 8 to 24 carbon atoms, with from 1 to about 30 moles of alkylene oxide per mole of alcohol may also be employed.

The alkyl polyglycosides which can be used as nonionic surfactants in the composition are generally represented by formula I:

$$R_1O(R_2O)_b(Z)_a \qquad \qquad I$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa. 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. GLUCOPON® 425 Surfactant—an alkyl polyglycoside in which the alkyl group contains 8 to 16 carbon atoms and having an average degree of polymerization of 1.48.
3. GLUCOPON® 625 Surfactant—an alkyl polyglycoside in which the alkyl group contains 12 to 16 carbon atoms and having an average degree of polymerization of 1.6.
4. APG® 325 Surfactant—an alkyl polyglycoside in which the alkyl group contains 9 to 11 carbon atoms and having an average degree of polymerization of 1.5.

5. GLUCOPON®600 Surfactant—an alkyl polyglycoside in which the alkyl group contains 12 to 16 carbon atoms and having an average degree of polymerization of 1.4.
6. PLANTAREN® 2000 Surfactant—an alkyl polyglycoside in which the alkyl group contains 8 to 16 carbon atoms and having an average degree of polymerization of 1.4.
7. PLANTAREN® 1300 Surfactant—an alkyl polyglycoside in which the alkyl group contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

Other alkyl polyglycosides which can be used in the compositions according to the invention are those in which the alkyl moiety contains from 6 to 18 carbon atoms in which and the average carbon chain length of the composition is from about 9 to about 14 comprising a mixture of two or more of at least binary components of alkylpolyglycosides, wherein each binary component is present in the mixture in relation to its average carbon chain length in an amount effective to provide the surfactant composition with the average carbon chain length of about 9 to about 14 and wherein at least one, or both binary components, comprise a Flory distribution of polyglycosides derived from an acid-catalyzed reaction of an alcohol containing 6–20 carbon atoms and a suitable saccharide from which excess alcohol has been separated.

A particularly preferred nonionic surfactant for use in the present invention is an alkyl polglycoside of formula I wherein $R_1$ is a monovalent organic radical having from about 8 to about 16 carbon atoms, b is zero, and a is a number having a value of from about 1.4 to about 1.6, and preferably about 1.5.

Suitable anionic surfactants include, but are not limited to, water-soluble salts of alkyl benzene sulfonates, alkyl sulfates, alkyl polyethoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, and alkyl phenol polyethoxyether sulfates.

Other suitable anionic surfactants include the water-soluble salts or esters of alpha-sulfonated fatty acids containing from about 6 to about 20 carbon atoms in the fatty acid group and from about 1 to about 10 carbon atoms in the ester group.

A particularly preferred anionic surfactant for use in the present invention is the monoethanolamine salt of tall oil fatty acid.

The primary solvent used in the present invention is a $C_6$–$C_{14}$ methyl ester. The use of methyl esters as a solvent in hard surface cleaning compositions is significantly more desirable than conventional solvents such as terpenes and hydrocarbon derivatives for both environmental and economic reasons.

Methyl esters suitable for use as solvents in the present hard surface cleaning composition are generally represented by the formula II:

$$R_1COOCH_3 \qquad \qquad II$$

wherein $R_1$ is an alkyl radical having from about 6 to about 14 carbon atoms. They are derived by the esterification of a fatty acid with methanol. Preferred methyl esters are those derived from the esterification of unsaturated fatty acids having from about 8 to about 10 carbon atoms. Suitable fatty acids from which the fatty acid esters may be derived include, but are not limited to, coconut and other vegetable oils, tallow, etc.

Suitable short-chain cosurfactants for use in the present invention include, but are not limited to, $C_3$–$C_6$ alcohols, glycols, glycol ethers, pyrrolidones and glycol ether esters. A particularly preferred short-chain cosurfactant is n-butyl alcohol.

According to one embodiment of the present invention, there is provided a terpene-free hard surface cleaning composition containing: (a) from about 0.2 to about 10% by weight, and preferably from about 2 to about 5% by weight of a nonionic surfactant, preferably an alkyl polyglycoside, (b) from about 0.5 to about 10% by weight, and preferably from about 4 to about 8% by weight of an anionic surfactant, preferably amine salts of fatty acids or of dodecyl benzene sulfonic acid, (c) from about 5 to about 95% by weight of a $C_6$–$C_{14}$ methyl ester solvent, preferably a $C_8$–$C_{10}$ methyl ester, (d) from about 0.5 to about 10% by weight, and preferably from about 4 to about 8% by weight of a short-chain cosurfactant, preferably n-butyl alcohol or glycol ether, and (e) remainder, water, all weights being based on the total weight of the composition.

Since methyl esters are subject to hydrolysis under alkaline conditions, it is imperative that the pH of the hard-surface cleaning composition be less than about 9, and preferably in the range of from about 6 to about 9.

The preferred amount of methyl ester solvent to be employed in the cleaning composition depends on the composition's end use. Hence, if the cleaning composition is used to completely remove an undesirable substance from a hard surface such as, for example, stripping paint from a painted surface, the preferred amount of methyl ester solvent to be used is from about 50 to about 95% by weight, based on the weight of the composition.

On the other hand, if the cleaning composition is used to remove an undesirable substance, such as graffiti, from a coated surface, such as a painted wall or railroad boxcar, the preferred amount of methyl ester solvent to be used is from about 15 to about 50% by weight, based on the weight of the composition.

It should be noted that additional auxiliaries may also be incorporated into the hard surface cleaning composition of the present invention without departing from the spirit of the invention. Examples of suitable auxiliaries which may be used include, but are not limited to, amphoteric surfactants, zwitterionic surfactants, pH buffering agents, dyes, perfumes, enzymes, preservatives, thickeners, hydrotropes, and the like.

According to another embodiment of the present invention, there is provided a process for cleaning a hard surface involving contacting the hard surface with the above-disclosed composition.

As was mentioned earlier, the precise amount of methyl ester solvent present in the composition depends on the type of cleaning to be performed. Hence, if a hard surface is to be completely stripped of any and all coatings thereon, the amount of methyl ester solvent present in the composition will range from about 50 to about 95% by weight, based on the weight of the composition. Similarly, if an undesirable substance, such as graffiti, is to be removed from a coated hard surface without damaging the underlying coating, the amount of methyl ester solvent present in the composition will range from about 15 to about 50% by weight, based on the weight of the composition.

However, another variable associated therewith is the dwell-time of the composition. Thus, if a hard surface is to be completely stripped of any coating substances, as is the case in paint stripping, the dwell-time of the composition on the hard surface will range from about 20 to about 45 minutes.

On the other hand, if an undesirable substance, such as graffiti, is to be removed from a coated hard surface without damaging the underlying coating, the dwell time of the composition on the hard surface will range from about 2 to about 20 minutes.

The present invention will be better understood by the examples which follow, all of which are intended for illustrative purposes only, and are not meant to unduly limit the scope of the invention in any way. Unless otherwise indicated, percentages are on a weight-by-weight basis.

EXAMPLES

Test Soil

A test soil was prepared containing the following components:

| Ingredient | Parts by weight |
| --- | --- |
| kerosene | 50 |
| vegetable oil | 5 |
| mineral oil | 7 |
| bandy black clay | 25 |
| carbon black | 1 |

Hard surface cleaning test compositions were prepared and used on solid white vinyl tiles containing the above-disclosed test soil. The test compositions were evaluated at 6.25% active in deionized water, i.e., an in-use dilution of 8 oz./gal. The precise formulation of the test cleaning compositions is found in the Table below.

| Ingredient | Example 1 | Comparative Ex. 1 |
| --- | --- | --- |
| water | 71.8 | 71.8 |
| tetrasodium EDTA-40% | 2 | 2 |
| GLUCOPON ® 425 | 5 | 5 |
| TRYCOL ® 5963 | 5 | 5 |
| EMERY ® 2209 | 8 | — |
| d'Limonene | — | 8 |
| STANDAMID ® SD | 4.5 | 4.5 |
| 2-butoxy ethanol | 3.7 | 3.7 |

GLUCOPON ® 425 = an alkyl polyglycoside in which the alkyl group contains 8 to 16 carbon atoms and having an average degree of polymerization of 1.48.
TRYCOL ® 5963 = Lauryl Alcohol + 8 moles EO
EMERY ® 2209 = $C_{8-10}$ Methyl Ester
STANDAMID ® SD = 1:1 Coco Diethanolamide The results of the evaluation are found in the Table below.

| | Example 1 | Comparative Ex. 1 |
| --- | --- | --- |
| % Soil Removal | 49.13 | 46.34 |

As can be seen from the results above, the hard surface cleaning composition in accordance with the present invention, which employs the disclosed methyl esters as a solvent, performs better than an identical cleaning composition containing a terpene as a solvent.

EXAMPLE 2

The following Methyl Ester microemulsion compositions were found to exhibit excellent paint removal ability from stainless steel substrates. Furthermore, both compositions have been evaluated as grafitti removers with outstanding results in field tests.

FORMULATION H175-85-1-B

| | % wt. |
| --- | --- |
| EMERY ® 2209 | 43.0 |
| Isopropylamine LAS | 8.0 |
| Propylene Glycol n-Butyl Ether | 6.0 |
| GLUCOPON ® 425 | 6.0 |
| Water | 37.0 |

FORMULATION H175-93-1-B

| | % wt. |
| --- | --- |
| EMERY ® 2209 | 26.0 |
| n-butyl alcohol | 7.5 |
| Tall Oil Fatty Acid | 5.0 |
| Monoethanolamine | 1.5 |
| GLUCOPON ® 425 | 10.0 |
| Water | 50.0 |

The above microemulsion compositions have distinct advantages over traditional grafitti remover compositions based on chlorinated solvents, aliphatic/aromatic solvents or caustic, as is seen in the Table below.

COMPARISON OF TYPES OF GRAFFITI REMOVERS

| CHARACTER-ISTIC | METHYLENE CHLORIDE BASED | SOLVENT BASED | CAUSTIC BASED | MICRO-EMULSION |
|---|---|---|---|---|
| Applicability | Broad | Broad | Narrow | Broad |
| Speed | Very Fast | Fast | Slow | Moderate to Fast |
| Cost | Low | Moderate | Low | Low to Moderate |
| Flammability | Non | Moderate | Non | Low by Design |
| Volatility | Very High | Moderate to High | Low | Low by Design |
| Toxicity | High | Moderate to High | High | Low by Design |
| Environmentally Acceptable | No | Maybe | Maybe | Complete |
| Corrosivity | No | No | Yes | No |
| Rinsability | Poor | Poor | Good | Good |

What is claimed is:

1. The process for removing graffiti from a painted surface without damaging underlying paint on the surface comprising contacting the painted surface with a terpene-free hard surface cleaning composition containing:
   (a) from about 0.2 to about 10% by weight of a nonionic surfactant component;
   (b) from about 0.5 to about 10% by weight of an anionic surfactant component;
   (c) from about 15 to about 50% by weight of a primary solvent consisting of a $C_6$–$C_{14}$ methyl ester component;
   (d) providing from about 0.5 to about 10% by weight of a short-chain cosurfactant component;
   (e) providing remainder, water; and
   (f) combining components (a)–(e) to form the composition, all weights being based on the total weight of the composition.

2. The process of claim 1 wherein the nonionic surfactant is selected from the group consisting of an alkyl polyglycoside, an alcohol ethoxylate, a nonyl phenol ethoxylate, an ethylene oxide/propylene oxide copolymer, an alkyl alkoxylate, and mixtures thereof.

3. The process of claim 1 wherein the nonionic surfactant is an alkyl polyglycoside of formula I:

$$R_1O(R_2O)_b(Z)_a \quad \text{I}$$

wherein $R_1$ is a monovalent organic radical having from about 8 to about 16 carbon atoms; $R_2$ is a divalent alkylene radical having from 2 to 4 carbon atoms; Z is a saccharide residue having 5 or 6 carbon atoms; b is zero; a is a number having a value from about 1.4 to about 1.6.

4. The process of claim 1 wherein the nonionic surfactant is present in the composition in an amount of from about 2 to about 5% by weight, based on the weight of the composition.

5. The process of claim 1 wherein the anionic surfactant is selected from the group consisting of alkali metal salts of fatty acids, organic base salts of fatty acids, alkyl sulfates, alkyl ether sulfates, alkyl aromatic sulfonates, alkyl sulfonates, alpha olefin sulfonates, sulfosuccinates, and mixtures thereof.

6. The process of claim 5 wherein the anionic surfactant is the monoethanolamine salt of tall oil fatty acid.

7. The process of claim 1 wherein the anionic surfactant is present in the composition in an amount of from about 4 to about 8% by weight, based on the weight of the composition.

8. The process of claim 1 wherein the primary solvent is a $C_8$–$C_{10}$ methyl ester.

9. The process of claim 1 wherein the painted surface from which graffiti is to be removed is contacted with the composition over a dwell-time ranging from about 2 to about 20 minutes.

10. The process of claim 1 wherein the short-chain cosolvent is selected from the group consisting of $C_3$–$C_6$ alcohols, glycols, glycol ethers, pyrrolidones, glycol ether esters, and mixtures thereof.

11. The process of claim 1 wherein the short-chain cosolvent is n-butyl alcohol.

12. The process of claim 1 wherein the short-chain cosurfactant is present in the composition in an amount of from about 4 to about 8% by weight, based on the weight of the composition.

13. The process of claim 1 wherein the composition has a pH value of less than about 9.

* * * * *